United States Patent
He

(10) Patent No.: US 10,172,002 B2
(45) Date of Patent: Jan. 1, 2019

(54) METHOD AND DEVICE FOR INFORMATION TRANSMISSION

(71) Applicant: Tencent Technology (Shenzhen) Company Limited, Shenzhen (CN)

(72) Inventor: Chang He, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 877 days.

(21) Appl. No.: 14/444,913

(22) Filed: Jul. 28, 2014

(65) Prior Publication Data
US 2015/0121469 A1 Apr. 30, 2015

Related U.S. Application Data

(63) Continuation of application No. PCT/CN2014/077085, filed on May 8, 2014.

(30) Foreign Application Priority Data

Oct. 31, 2013 (CN) .......................... 2013 1 0530480

(51) Int. Cl.
*H04W 12/08* (2009.01)
*H04W 4/21* (2018.01)
(Continued)

(52) U.S. Cl.
CPC ............ *H04W 12/08* (2013.01); *H04B 11/00* (2013.01); *H04W 4/008* (2013.01); *H04W 4/023* (2013.01);
(Continued)

(58) Field of Classification Search
None
See application file for complete search history.

(56) References Cited

U.S. PATENT DOCUMENTS 4,832,437 A * 5/1989 Kim .......................... G02B 6/14
385/1
5,511,041 A * 4/1996 Michalski ............. G01S 7/5273
367/97
(Continued)

FOREIGN PATENT DOCUMENTS

CN 102222370 A 10/2011
CN 102522090 A 6/2012
(Continued)

OTHER PUBLICATIONS

Tencent Technology, Written Opinion, PCT/CN2014/077085, dated Jul. 9, 2014, 5 pgs.
(Continued)

*Primary Examiner* — Paul R Fisher
(74) *Attorney, Agent, or Firm* — Morgan, Lewis & Bockius LLP

(57) ABSTRACT

A method and device for transmitting product information using ultrasonic signals are disclosed. The device detects local availability of ultrasound-encoded product information while the device is at a location in proximity to an ultrasound transmitter. In response to detecting the local availability of the ultrasound-encoded product information, the device requests a user permission from a user of the device to capture the ultrasound-encoded product information. Upon obtaining the user permission to capture the ultrasound-encoded product information, the device receives, from the ultrasound transmitter, an ultrasonic signal encoded with a message containing respective information associated with a respective product. The device decodes the ultrasonic signal to obtain the message in a human-perceivable form.

17 Claims, 11 Drawing Sheets

(51) Int. Cl.
*H04W 4/80* (2018.01)
*H04B 11/00* (2006.01)
*H04W 4/00* (2018.01)
*H04W 4/02* (2018.01)
*H04W 4/20* (2018.01)

(52) U.S. Cl.
CPC ............. *H04W 4/206* (2013.01); *H04W 4/21* (2018.02); *H04W 4/80* (2018.02)

(56) References Cited

U.S. PATENT DOCUMENTS

| | | | | |
|---|---|---|---|---|
| 5,946,605 | A * | 8/1999 | Takahisa | H04H 20/28 455/150.1 |
| 6,253,146 | B1 * | 6/2001 | Hanson | G01C 21/3415 340/905 |
| 6,359,902 | B1 * | 3/2002 | Putzolu | H04N 7/17318 370/466 |
| 6,545,978 | B1 * | 4/2003 | Sakurai | H04Q 11/0478 370/230 |
| 2001/0029482 | A1 * | 10/2001 | Tealdi | G06Q 20/105 705/38 |
| 2003/0092376 | A1 * | 5/2003 | Syed | G06K 13/0825 455/3.06 |
| 2004/0110517 | A1 * | 6/2004 | Ellman | G06Q 30/0601 455/466 |
| 2006/0277059 | A1 * | 12/2006 | J'maev | G06Q 10/06 705/29 |
| 2012/0149439 | A1 * | 6/2012 | Nakae | H04M 1/575 455/566 |
| 2013/0297422 | A1 * | 11/2013 | Hunter | G06Q 30/0261 705/14.58 |

FOREIGN PATENT DOCUMENTS

CN 102592232 A 7/2012
CN 103152106 A 6/2013

OTHER PUBLICATIONS

Tencent Technology, IPRP, PCT/CN2014/077085, May 3, 2016, 6 pgs.
Tencent Technology, ISR, PCT/CN2014/077085, Jul. 9, 2014, 3 pgs.

* cited by examiner

METHOD AND DEVICE FOR INFORMATION TRANSMISSION

RELATED APPLICATIONS

This application is a continuation application of PCT Patent Application No. PCT/CN2014/077085, entitled "METHOD AND DEVICE FOR INFORMATION TRANSMISSION" filed on May 8, 2014, which claims priority to Chinese Patent Application Serial No. CN201310530480.8, entitled "Method and Related Device and System for Information Transmission", filed on Oct. 31, 2013, both of which are incorporated herein by reference in their entirety.

TECHNICAL FIELD

The present application relates to the field of information transmission, and particularly to an information transmission method and a related device and/or system.

BACKGROUND

In daily life, to release product information more effectively to attract consumers, speaker equipments are typically used in shopping malls, shops, museums and other places to broadcast product information. Although such a brutal way of releasing product information can achieve a certain level of product advertising effect, it can cause serious noise pollution. Thus, a need exists for a method, device and system that can deliver product information to potential customers without generating excessive noise pollution.

SUMMARY

The above deficiency associated with the known method and device for information transmission may be reduced or eliminated by the techniques described herein.

In some embodiments, a method for information transmission is performed at a client device. The client device has one or more processors and memory for storing programs to be executed by the one or more processors. The method includes detecting local availability of ultrasound-encoded product information while the client device is at a location in proximity to an ultrasound transmitter. The method includes requesting, in response to the detection of local availability of the ultrasound-encoded product information, a user permission from a user of the client device to capture the ultrasound-encoded product information. In some instances, the user permission is obtained by detecting no explicit user rejection to the requesting during a predetermined time window after the requesting. The method also includes receiving, upon obtaining the user permission, an ultrasonic signal from the ultrasound transmitter, where the ultrasonic signal is encoded with a message containing respective information associated with a respective product. The method further includes decoding the ultrasonic signal to obtain the message in a human-perceivable form. Additionally, the method includes outputting at least part of the message in an audible form.

In some embodiments, an electronic device includes one or more processors and memory storing one or more programs for execution by the one or more processors. The one or more programs include instructions for performing operations of the information transmission method described herein. In some embodiments, a non-transitory computer readable storage medium stores one or more programs including instructions to be executed by a client device with one or more processors. The instructions, when executed by the client device, cause the client device to perform the operations of the information transmission method described herein.

Various advantages of the present application are apparent in light of the descriptions below.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

In order to make the objectives, technical solutions, and advantages of the present application comprehensible, embodiments of the present application are further described in detail below with reference to the accompanying drawings.

Figure 1:
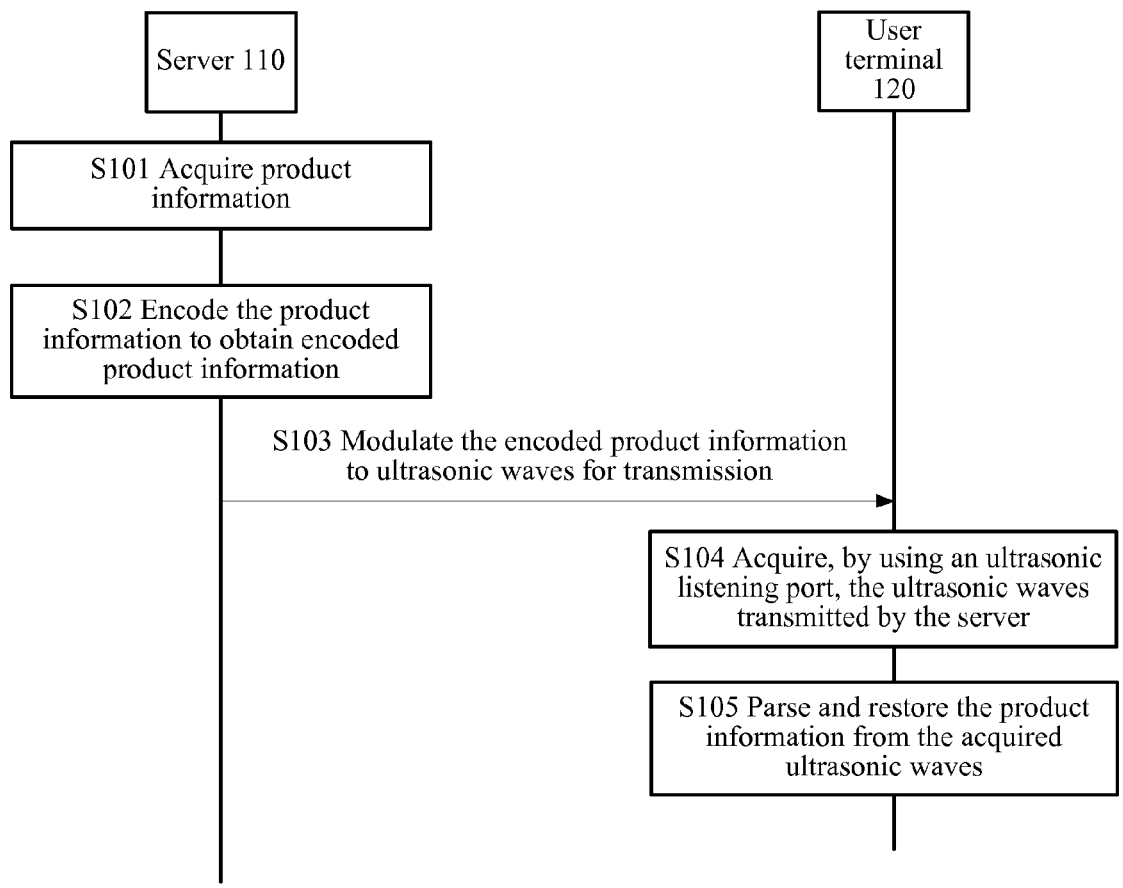
FIG. 1 is a flowchart illustrating an information transmission method performed at a server and a user terminal in accordance with some embodiments.

FIG. 1 is a flowchart illustrating an exemplary information transmission method 100 performed at a server 110 and a user terminal 120 in accordance with some embodiments. At least a first portion of the method 100 is performed at the server 110, and at least a second portion of the method 100 is performed at the user terminal 120. The server 110 is operatively coupled to and communicates with the user terminal 120 via, for example, a wireless communication connection.

The server 110 can be any device that can transmit information to one or more receiving devices via ultrasonic signals. Specifically, the server 110 can be configured to encode product information and/or other data or information into ultrasonic signals, and then transmit the ultrasonic signals encoded with the product information and/or other data or information to the one or more receiving devices. In some embodiments, the server 110 can be, for example, a workstation, a database server, a data processing server, a desktop computer, a laptop computer, and/or the like. Particularly, as described in detail below, the server 110 can be a server device associated with a store and configured to transmit information related to product(s) of that store to shoppers that are at a location in proximity to the server 110.

In some embodiments, an operator (e.g., a store manager) that operates the server 110 can enter product information and/or other data or information into the server 110 via, for example, a keyboard, a mouse, fingers (on a touch screen), a touch pen, and/or any other suitable input means. In some other embodiments, the server 110 can receive product information and/or other data or information from another device (e.g., a database server) operatively coupled to the server 110.

In some embodiments, the server 110 can be a standalone device that is equipped with an ultrasound transmitter. For example, the server 110 can be a workstation equipped with an ultrasound transmitter. For another example, the server 110 can be a laptop computer capable of transmitting ultrasonic signals. In some other embodiments, the server 110 can be a system including a server device and one or more ultrasound transmitters that are physically separate from the server device. The server device can be operatively coupled to and communicate with the one or more ultrasound transmitters using any suitable connection such as, for example, an optical connection (e.g., an optical cable and optical connectors), an electrical connection (e.g., an electrical cable and electrical connectors), a wireless connection (e.g., a wireless link and wireless signal transceivers), and/or the like.

The user terminal 120 can be any electronic device operated by a user (not shown in FIG. 1) that can receive information via ultrasonic signals. Specifically, the user terminal 120 can be configured to receive, from a transmitting device (e.g., an ultrasound transmitter controlled by the server 110), ultrasonic signals encoded with product information and/or other data or information, and then decode the ultrasonic signals to obtain the product information and/or other data or information. The user terminal 120 can be, for example, a mobile phone, a smart phone, a mobile Internet device (MID), a tablet, a personal digital assistant (PDA), a laptop computer, a handheld computer, and/or any other portable electronic device. Particularly, as described in detail below, the user operating the user terminal 120 can be a shopper, a customer or a pedestrian at a location in proximity to the server 110 (or the ultrasound transmitter of the server 110) associated with a store. As a result, the user terminal 120 can receive information related to product(s) of that store from the server 110. In some embodiments, a large store may optionally uses multiple servers and/or transmitters to cover the entire area of the store.

In some embodiments, the user terminal 120 can be equipped with an ultrasound receiver (e.g., an internal ultrasound receiver). For example, the user terminal 120 can be a smart phone with an embedded ultrasound receiver. In some other embodiments, the user terminal 120 can be an electronic device connected to and operating with an ultrasound receiver (e.g., an external ultrasound receiver). For example, the user terminal 120 can be a laptop connected to an external ultrasound receiver. In some embodiments, a user terminal can be referred to as, for example, a user device, a client device, a terminal device, and/or the like.

An ultrasound transmitter or an ultrasound receiver described herein can be any device capable of generating or receiving sound waves in the ultrasonic range, i.e., a frequency substantially greater than the upper limit of the normal human hearing range (e.g., above 20 kHz approximately). In some embodiments, an ultrasound transmitter or an ultrasound receiver can operate with, for example, frequencies from 20 kHz up to several gigahertz. In some embodiments, an ultrasound transmitter or ultrasound receiver can be, for example, an ultrasonic sensor, an ultrasonic transceiver, an ultrasonic transducer, etc.

In some embodiments, each of the server 110 and the user terminal 120 that collectively perform the method 100 can include one or more processors and memory. In some embodiments, the first portion of the method 100, which is performed at the server 110, is governed by instructions that are stored in a non-transitory computer readable storage medium of the server 110 and executed by one or more processors of the server 110. Similarly, the second portion of the method 100, which is performed at the user terminal 120, is governed by instructions that are stored in a non-transitory computer readable storage medium of the user terminal 120 and executed by one or more processors of the user terminal 120. As a result of the method 100 being performed, information can be transmitted from the server 110 to the user terminal 120. As shown in FIG. 1, the information transmission method 100 includes the following steps.

At S101, the server 110 acquires product information. As described above, the server 110 can be associated with, for example, a store. The product information related to product(s) of that store can be, for example, entered by an operator into the server 110, or retrieved by the server 110 from another device (e.g., a database server) operatively coupled to the server 110. The product information can include, for example, an advertisement, a discount, a coupon, and/or any other suitable information that can potentially increase awareness of a product, arise interest of a shopper, assist a customer to make a decision, and/or the like. In some embodiments, the product information can include one or a combination of, for example, a product price, product description information (e.g., ingredients, manufacturers, production address, date, preferential policies, sales address, etc.), a product link address (e.g., a URL), and/or the like. In some embodiments, the product information acquired can be in the form of an image, a text string, an audio clip, a video clip, and/or any other human-perceivable form.

At S102, the server 110 encodes the product information to obtain encoded product information. Such encoded product information can be in any format that is suitable to be transmitted over ultrasonic signals. In other words, the product information in human-perceivable form is transformed into, for example, machine-readable data that is ready to be modulated into ultrasonic waves. For example, product information in the form of an audio clip can be encoded into a series of binary bits.

At S103, the server 110 modulates the encoded product information to ultrasonic waves for transmission. As a result, the server 110 generates ultrasonic signals encoded with a message that contains the product information. In some embodiments, the message can be encoded into the ultrasonic signals using any suitable wireless communication modulation and coding scheme (e.g., phase-shift keying (PSK), amplitude-shift keying (ASK), frequency-shift keying (FSK), etc.).

Figure 7:
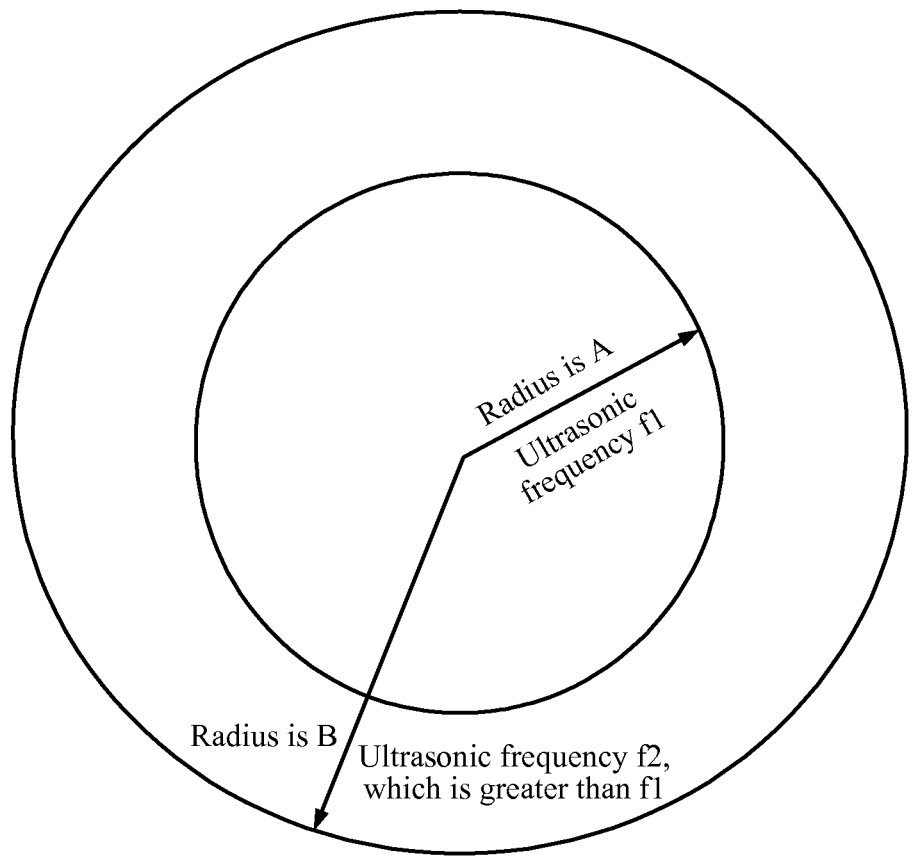
FIG. 7 is a schematic diagram illustrating coverage areas of a server in accordance with some embodiments.

In some embodiments, the modulated ultrasonic signals can be broadcast from the server 110 to a coverage area with a certain radius surrounding the server 110, such that any receiving device equipped with an ultrasonic receiver (e.g., the user terminal 120) that is within that coverage area can potentially receive the ultrasonic signals. In such embodiments, the radius of the coverage area can depend on, for example, the frequency, power, and/or any other factor or parameter of the ultrasonic signals. Details of the broadcast coverage of the ultrasonic signals are shown in FIG. 7 and described below. Furthermore, in some embodiments, the server 110 can broadcast the ultrasonic signals independent of the existence of any receiving device within the coverage area. In such embodiments, a receiving device (e.g., the user terminal 120) within the coverage area of the ultrasonic signals can receive the ultrasonic signals by, for example, activating an ultrasonic listening port of that receiving device, as described below with respect to step S104.

At S104, the user terminal 120 acquires, by using an ultrasonic listening port, ultrasonic waves transmitted by the server 110. In some embodiments, prior to the user terminal 120 detecting or receiving the ultrasonic signals transmitted from the server 110, the user of the user terminal 120 elects to receive a service associated with receiving messages including product information via ultrasonic signals. The user can subscribe the user terminal 120 to the service by, for example, using the user terminal 120 or any other device (e.g., a computer connected to the Internet) to send a subscription request to a server associated with the service. Upon the subscription request being approved, for example, an application associated with the service can be downloaded to the user terminal 120. The user terminal 120 can use the application to activate an ultrasonic listening port to receive ultrasonic signals containing product information that are associated with the service. In some embodiments, as a result of the user terminal 120 being subscribed to the service, the user terminal 120 (e.g., the ultrasonic listening port of the user terminal 120) can be configured such that the user terminal 120 is able to detect and receive ultrasonic signals encoded with product information. On the other hand, a user terminal not subscribed to the service is not able to detect or receive ultrasonic signals encoded with product information, even though an ultrasonic listening port of that user terminal is activated.

Figure 3:
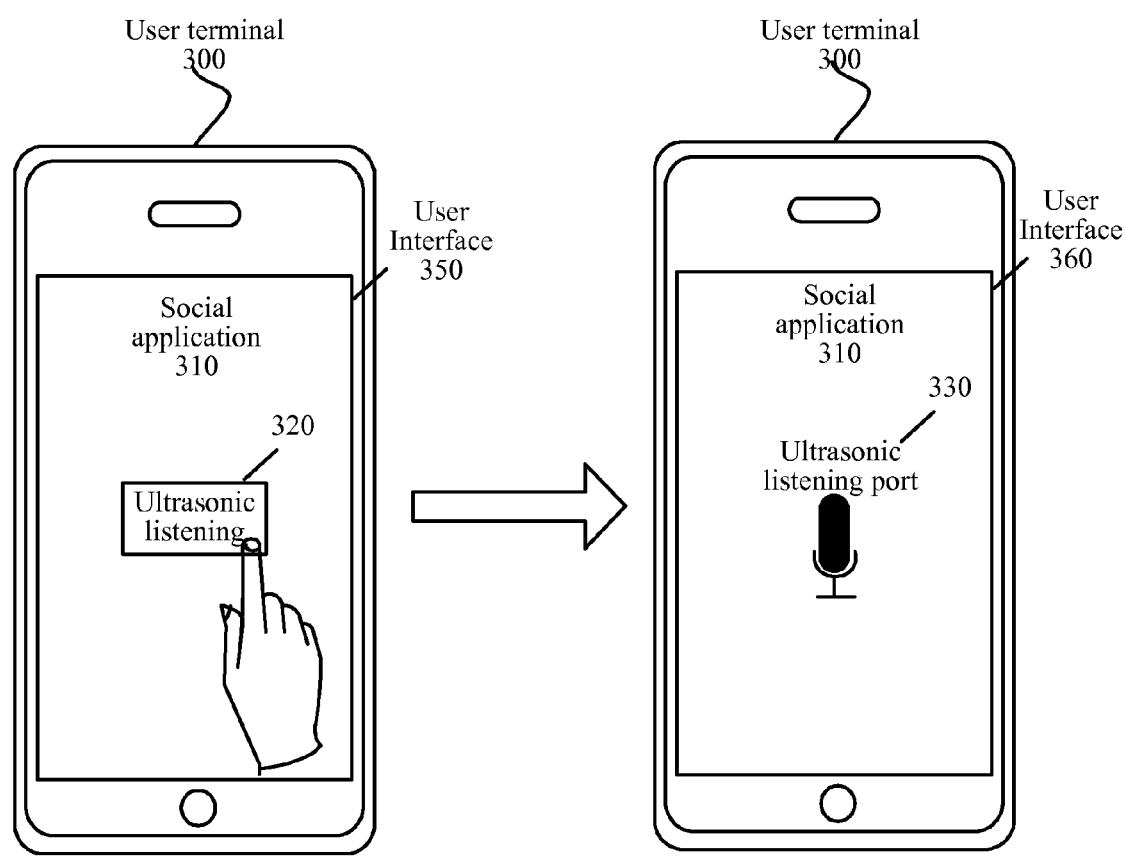
FIG. 3 is a schematic diagram illustrating a user interface change in performing information transmission in accordance with some embodiments.
Figure 4:
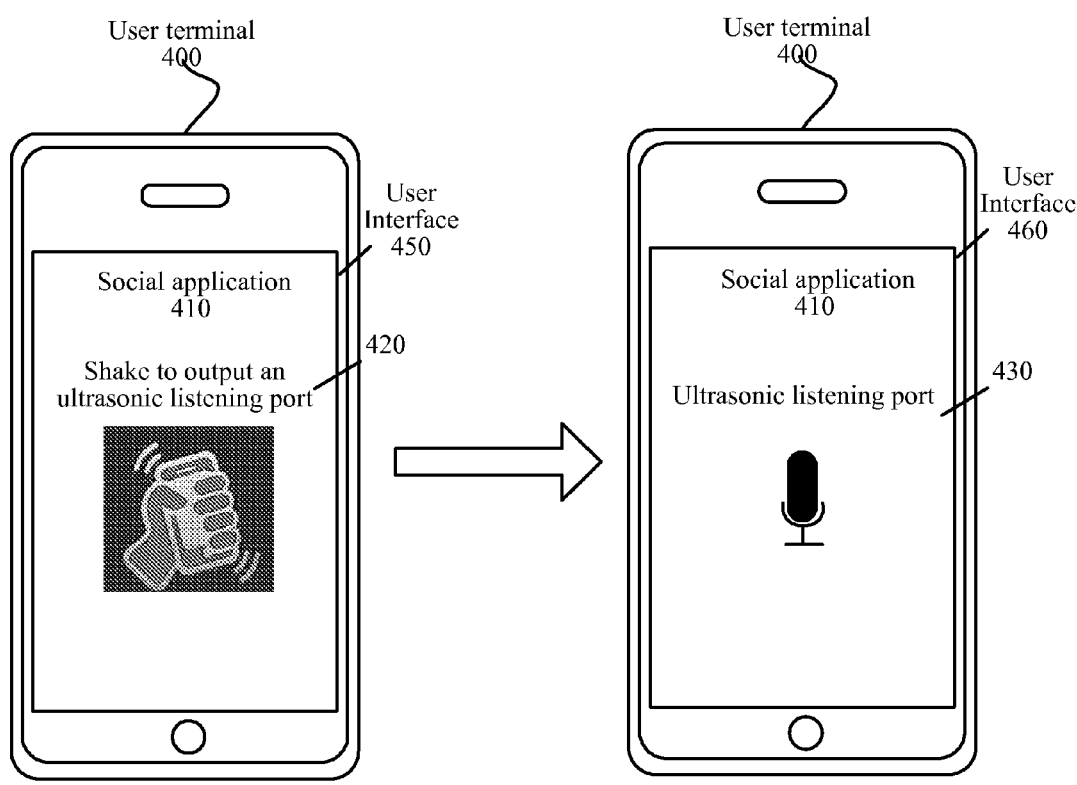
FIG. 4 is a schematic diagram illustrating a user interface change in performing information transmission in accordance with some embodiments.

After the user terminal 120 is subscribed to the service, the user terminal 120 is configured to be able to detect or receive ultrasonic signals encoded with product information associated with the service. Thus, when the user terminal 120 is within the coverage area of the ultrasonic signals broadcast from the server 110 (e.g., when the user terminal 120 is at a location in proximity to the ultrasound transmitter of the server 110), the user terminal 120 (e.g., a sensor of the user terminal 120) detects local availability of the ultrasonic signals that are encoded with the product information. In some instances, in response to the detection of the ultrasonic signals, the user terminal 120 automatically receives the ultrasonic signals. That is, the user terminal 120 receives the ultrasonic signals without obtaining a user permission from the user of the user terminal 120. In other instances, in response to the detection of the ultrasonic signals, the user terminal 120 requests a user permission from the user of the user terminal 120. In such instances, for example, the user terminal 120 can display a message to indicate the existence of product information, and prompt the user to affirmatively permit (e.g., by clicking an "OK" button) obtaining the product information. For another example, as shown in FIGS. 3, 4 and described below, the user terminal 120 can obtain the user permission by requesting the user to activate an ultrasonic listening port.

In some embodiments, the user terminal 120 can request an explicit user permission from the user to capture the ultrasound signals encoded with the product information. Similarly stated, a user permission can be obtained by the user terminal 120 if and only if an explicit indication of user permission is received by the user terminal in response to the requesting, for example, during a predetermined time window after the requesting. In such embodiments, the default operation for the user terminal 120 is not to receive the ultrasonic signals. For example, the user terminal 120 displays a user interface icon on a screen of the user terminal 120 to indicate existence of product information. The user terminal 120 also displays a "Receive" button and a "Cancel" button on the screen, prompting a response from the user. The user terminal 120 receives a user permission if the user clicks the "Receive" button within a predetermined time period (e.g., 2 minutes) after the buttons are displayed. Otherwise, the user terminal 120 fails to receive any user permission if the user fails to click the "Receive" button within the predetermined time period or the user clicks the "Cancel" button within the predetermined time period.

In some other embodiments, the user terminal 120 can request an implicit user permission from the user to capture the ultrasound signals encoded with the product information. Similarly stated, a user permission can be obtained by the user terminal 120 if an explicit indication of user rejection is not received by the user terminal in response to the requesting, for example, during a predetermined time window after the requesting. In such embodiments, the default operation for the user terminal 120 is to receive the ultrasonic signals. For example, the user terminal 120 displays a user interface icon on a screen of the user terminal 120 to indicate existence of product information. The user terminal 120 also displays a timer counting down from a predetermined time length (e.g., 1 minute), a "Receive" button and a "Cancel" button on the screen, prompting a response from the user. The user terminal 120 receives a user permission if (1) the user clicks the "Receive" button before the timer counts down to 0, or (2) the user fails to click the "Cancel" button before the timer counts down to 0.

Upon obtaining the user permission to capture the ultrasonic signals containing the product information, the user terminal 120 is configured to receive the ultrasonic signals. Otherwise, in response to a failure to obtain the user permission, the user terminal 120 is configured not to receive the ultrasonic signals. After the user terminal 120 acquires the ultrasonic waves transmitted by the server 110 (with or without a user permission from the user of the user terminal 120), at S105, the user terminal 120 parses and restores the product information from the acquired ultrasonic waves. Specifically, the user terminal 120 can decode the ultrasonic signals to obtain the message containing the product information. In some embodiments, the ultrasonic signals are demodulated and decoded at the user terminal 120 using a wireless communication demodulation and decoding scheme corresponding to the modulation and coding scheme used at the server 110.

In some embodiments, the message can be obtained at the user terminal 120 in a human-perceivable form (e.g., a text string, an image, an audio clip, a video clip, etc.), and at least part of the message can be output from the user terminal 120 to the user. For example, an audio clip containing an advertisement of a product can be played by the user terminal 120. For another example, a text message including a discount of a product can be displayed on a screen of the user terminal 120.

In some embodiments, the message is automatically output (e.g., displayed, presented, played) to the user once the message is obtained (e.g., decoded from the ultrasonic signals) at the user terminal 120. In other embodiments, the message is not automatically output to the user without an instruction from the user to access (e.g., view, listen) the message. In such embodiments, the message can be stored in a memory of the user terminal such that the message can be retrieved by the user at a later time. Additionally, in some embodiments, the user terminal 120 has a limited memory space for storing a certain number of messages containing product information. In some embodiments, a message containing product information can be removed from the memory of the user terminal 120 after a predefined period of time, or when the message is replaced in the memory by a newly obtained message.

As described with respect to steps S101-S105, the information transmission method 100 is performed by the server 110 and the user terminal 120 collectively. Particularly, as shown in FIG. 1 and described herein, transmitting product information by using ultrasonic waves does not make the human ear feel noisy, and therefore noise pollution can be effectively suppressed.

Figure 2:
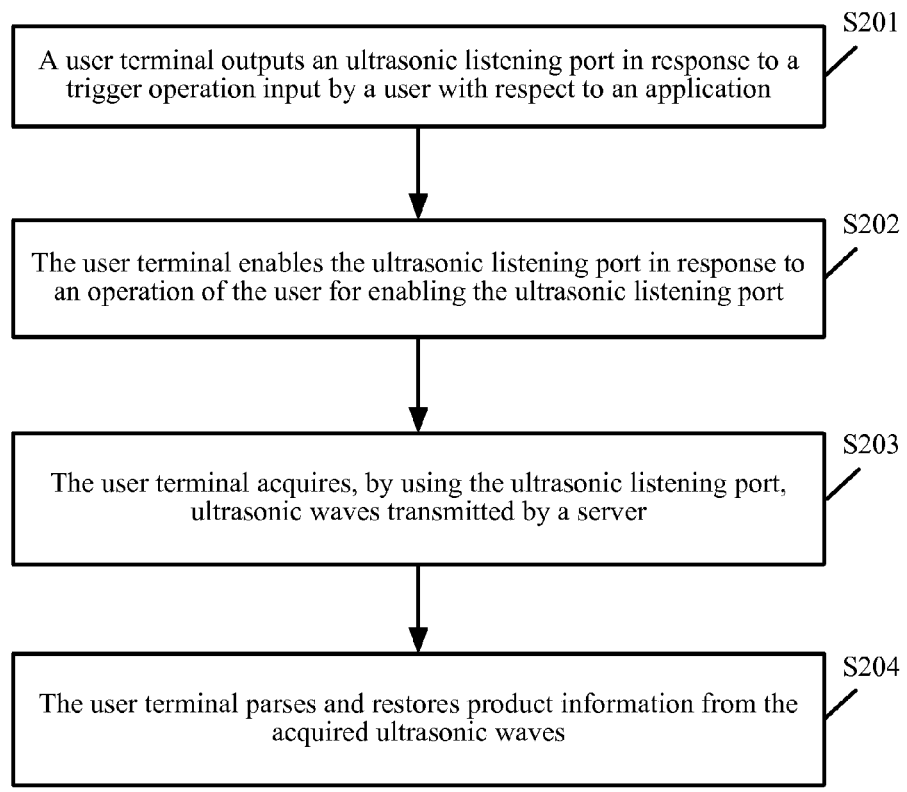
FIG. 2 is a flowchart illustrating of an information transmission method performed at a user terminal in accordance with some embodiments.

FIG. 2 is a flowchart illustrating of an information transmission method 200 performed at a user terminal in accordance with some embodiments. The method 200 can be similar to at least the second portion of the method 100 that is performed at the user terminal 120. The user terminal performing the method 200 can be similar to the user terminal 120 shown and described with respect to FIG. 1. Particularly, similar to the user terminal 120, the user terminal performing the method 200 is equipped with an ultrasonic receiver and thus capable of receiving ultrasonic signals. Furthermore, although not shown in FIG. 2, the user terminal performing the method 200 is configured to be operatively coupled to and communicate with one or more server devices similar to the server 110 shown and described with respect to FIG. 1. Particularly, similar to the server 110, the server device(s) communicating with the user terminal performing the method 200 is equipped with an ultrasonic transmitter and thus capable of transmitting ultrasonic signals.

In some embodiments, the user terminal performing the method 200 can include one or more processors and memory. In some embodiments, the method 200 is governed by instructions that are stored in a non-transitory computer readable storage medium of that user terminal and executed by one or more processors of that user terminal. As shown in FIG. 2, the information transmission method 200 includes the following steps.

At S201, the user terminal outputs an ultrasonic listening port in response to a trigger operation input by a user of the user terminal with respect to an application. The application is associated with a service provided to the user terminal for receiving messages including product information via ultrasonic signals. In some embodiments, the application can be downloaded to and/or activated on the user terminal upon the user terminal being subscribed to the service. In some embodiments, the application can be, for example, a commercial application that provides assistance to users in shopping. Such a commercial application can provide users with, for example, a discount of a product, a coupon of a store, sales information, feature of products, advertisements, and/or other information useful for the users to make a decision in shopping. In other embodiments, the application can be, for example, a social application such as a micro blog application and an instant messaging application, an entertainment application such as a music application and a game application, and/or any other suitable application.

In some embodiments, the ultrasonic listening port can be associated with a software port (stored in and executed at hardware of the user terminal). In such embodiments, upon receiving an instruction (e.g., via the trigger operation) from the user to output the ultrasonic listening port, the user terminal can, for example, display an icon of the ultrasonic listening port on a display (e.g., monitor, screen) of the user terminal, indicating the ultrasonic listening port is ready to be activated.

The trigger operation performed by the user to provide the instruction to output the ultrasonic listening port can be in any predefined, suitable manner. For example, FIG. 3 is a schematic diagram illustrating a user interface change in performing information transmission in accordance with some embodiments. As shown in FIG. 3, a user interface 350 of a user terminal 300 (on the left side of FIG. 3) is changed to a user interface 360 of the user terminal 300 (on the right side of FIG. 3) in response to a user clicking a "ultrasonic listening" button 320, which is a plug-in icon of a social application 310. Specifically, the "ultrasonic listening" button 320 is associated with a function of listening to ultrasonic waves broadcast around the user terminal 300. The user instructs the user terminal 300 to perform the function by clicking the "ultrasonic listening" button 320. As a result, an "ultrasonic listening port" icon 330 is displayed on the user interface 360, indicating that an ultrasonic listening port of the user terminal 300 is ready to be activated. Thus, the social application 310 outputs the ultrasonic listening port of the user terminal 300 (i.e., displays an icon of the ultrasonic listening port on the screen of the user terminal 300).

For another example, FIG. 4 is a schematic diagram illustrating an user interface change in performing information transmission in accordance with some embodiments. As shown in FIG. 4, a user interface 450 of a user terminal 400 (on the left side of FIG. 4) is changed to a user interface 460 of the user terminal 400 (on the right side of FIG. 4) in response to a user shaking the user terminal 400 in accordance with the instruction provided by an icon 420 ("shake to output an ultrasonic listening port") of a social application 410. Specifically, the icon 420 is associated with a function of listening to ultrasonic waives broadcast around the user terminal 400. The user instructs the user terminal 400 to perform the function by shaking the user terminal 400 as instructed by the icon 420. As a result, an "ultrasonic listening port" icon 430 is displayed on the user interface 460, indicating that an ultrasonic listening port of the user terminal 400 is ready to be activated. Thus, the social application 410 outputs the ultrasonic listening port of the user terminal 400 (i.e., displays an icon of the ultrasonic listening port on the screen of the user terminal 400).

At S202, the user terminal enables the ultrasonic listening port in response to an operation of the user for enabling the ultrasonic listening port. In some embodiments, the user can operate on a user interface icon representing the ultrasonic listening port to activate the ultrasonic listening port. In the examples of FIGS. 3 and 4, the user can, for example, click or double-click the "ultrasonic listening port" icon 330 or 430 to activate the ultrasonic listening port of the user terminal 300 or the ultrasonic listening port of the user terminal 400, respectively.

In one embodiment, the user can click or double-click the ultrasonic listening port output on the interface as shown in FIG. 3 or FIG. 4, and then input an operation instruction for enabling the ultrasonic listening port to the user terminal, so that the user terminal can enable the ultrasonic listening port in response to the operation for enabling the ultrasonic listening port. Although shown as two steps S201 and S202 in FIG. 2, in some embodiments, the trigger operation to output an ultrasonic listening port and the operation to enable (i.e., activate) that ultrasonic listening port can be combined into a single operation. For example, as shown in FIG. 3, as a result of the user clicking the "ultrasonic listening" button 320 in the user interface 350, the "ultrasonic listening port" icon 330 is displayed on the user interface 360; and meanwhile, the ultrasonic listening port of the user terminal 300 is activated and starts to receive ultrasonic signals.

In some embodiments, an ultrasonic listening port of a user terminal can be associated with a hardware device or component of that user terminal such as, for example, an ultrasonic receiver, an ultrasonic sensor, an ultrasonic antenna, etc. In such embodiments, upon receiving an instruction (e.g., via an operation on an icon representing the ultrasonic listening port and displayed on a screen of the user terminal) from the user to activate the ultrasonic listening port, the user terminal can, for example, activate the hardware device or component such that the hardware device or component starts to receive ultrasonic signals broadcast around the user terminal.

At S203, as a result of the ultrasonic listening port being activated, the user terminal acquires, by using the ultrasonic listening port, ultrasonic waves transmitted by a server. The server can be one of the server devices that are configured to be operatively coupled to and can potentially communicate with the user terminal. The ultrasonic waves can be encoded with message(s) containing product information. In some embodiments, the ultrasonic waves can have a frequency of, for example, above 20 kHz. In other words, the frequency of the ultrasonic waves is substantially greater than the upper limit of the normal human hearing range. In such embodiments, the transmitted ultrasonic waves are not heard by normal human ears, thus not making noise for the normal human ears.

At S204, the user terminal parses and restores product information from the acquired ultrasonic waves. Specifically, the user terminal decodes the ultrasonic waves to obtain the message(s) containing the product information. The obtained message(s) can then be output in a human-perceivable form (e.g., an image, a text string, an audio clip, a video clip, etc.) to the user. In some embodiments, the obtained message(s) can be stored in a memory of the user terminal to be accessed by the user at a later time.

In some embodiments, after the ultrasonic signals are received at the user terminal, the user terminal can deactivate the ultrasonic listening port to, for example, reduce energy consumption. In some embodiments, the user terminal can automatically deactivate the ultrasonic listening port, for example, a predetermined period of time after the ultrasonic signals are successfully received at the user terminal. In other embodiments, the ultrasonic listening port can be deactivated in response to an instruction received from the user operating the user terminal. For example, the user can indicate to revoke a previously-issued user permission for receiving the ultrasonic signals. As a result, the ultrasonic listening port of the user terminal is deactivated, and the user terminal is prevented from receiving any new ultrasonic signal.

In some embodiments, although not shown in FIG. 2, additional step(s) can be performed by the user terminal between S203 and S204. Specifically, for example, after receiving the ultrasonic waves, the user terminal can output a message (e.g., display a text message or an image, play a voice message, etc.) indicating the capture of the product information and prompting a response from the user. The user can be prompted to provide a user permission for the user terminal to output the product information. Similar to the user permission associated with receiving ultrasonic signals described above, the user permission associated with outputting the product information can be an explicit user permission (i.e., an affirmative response is required to allow the output of the product information) or an implicit user permission (i.e., an explicit rejection is required to disallow the output of the product information). Upon obtaining the user permission, the user terminal outputs the product information (e.g., display a text message or an image, play an audio clip, play a video clip, etc.). Otherwise, the user terminal refrains from outputting the product information. Additionally, in some embodiments, the user is provided with an option to save the product information (e.g., in a memory of the user terminal) for a future retrieval.

Figure 5:
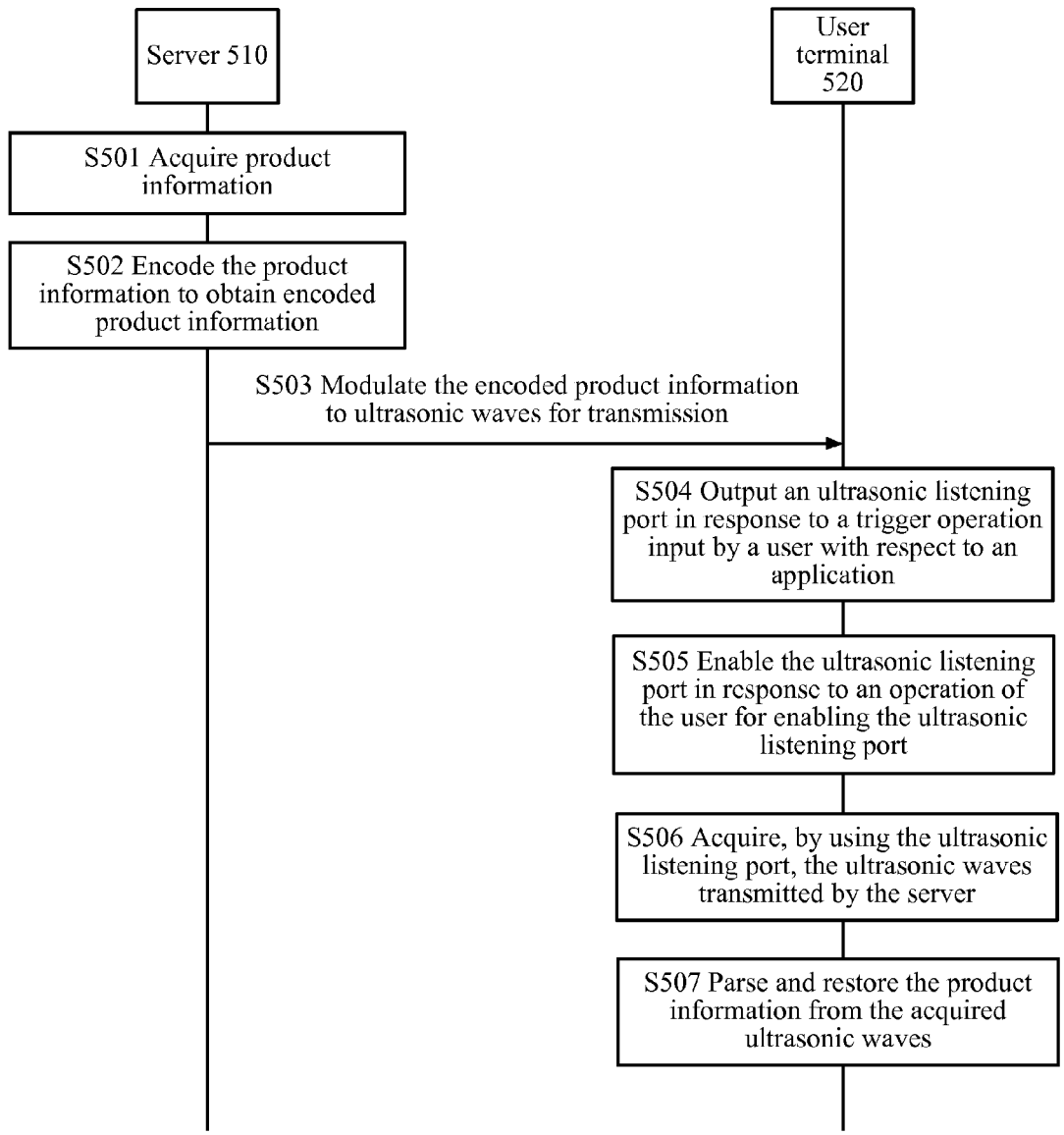
FIG. 5 is a flowchart illustrating an information transmission method performed at a server and a user terminal in accordance with some embodiments.

FIG. 5 is a flowchart illustrating an exemplary information transmission method 500 performed at a server 510 and a user terminal 520 in accordance with some embodiments. Similar to the method 100 shown and described with respect to FIG. 1, at least a first portion of the method 500 is performed at the server 510, and at least a second portion of the method 500 is performed at the user terminal 520. The server 510 can be structurally and functionally similar to the server 110 in FIG. 1, and the user terminal 520 can be structurally and functionally similar to the user terminal 120 in FIG. 1.

In some embodiments, each of the server 510 and the user terminal 520 that collectively perform the method 500 can include one or more processors and memory. In some embodiments, the first portion of the method 500, which is performed at the server 510, is governed by instructions that are stored in a non-transitory computer readable storage medium of the server 510 and executed by one or more processors of the server 510. Similarly, the second portion of the method 500, which is performed at the user terminal 520, is governed by instructions that are stored in a non-transitory computer readable storage medium of the user terminal 520 and executed by one or more processors of the user terminal 520. As a result of the method 500 being performed, information can be transmitted from the server 510 to the user terminal 520. As shown in FIG. 5, the information transmission method 500 includes the following steps.

At S501, the server 510 acquires product information. The product information can be entered by an operator of the server 510 or received from another device such as a provider server. At S502, the server 510 encodes the product information to obtain encoded product information. As a result, the product information is transformed from a human-perceivable form to machine-readable data that is ready to be modulated into ultrasonic waves. At S503, the server 510 modulates the encoded product information to ultrasonic waves for transmission. As a result, the server 510 generates ultrasonic waves encoded with one or more messages containing the product information.

At S504, the user terminal 520 outputs an ultrasonic listening port in response to a trigger operation input by a user with respect to an application. As shown and described above with respect to FIGS. 3 and 4, the trigger operation performed by the user to provide the instruction to output the ultrasonic listening port can be in any predefined, suitable manner. At S505, the user terminal 520 enables the ultrasonic listening port in response to an operation of the user for enabling the ultrasonic listening port. As a result, the ultrasonic listening port of the user terminal 520 is activated to receive the ultrasonic waves.

In some embodiments, upon detecting the ultrasonic waves encoded with the product information, the user terminal 520 requests a user permission from the user to capture the ultrasound-encoded product information. The user can provide the user permission by, for example, performing the trigger operation to output the ultrasonic listening port in S504 and/or performing the operation to enable the ultrasonic listening port in S505. Consequently, at S506, the user terminal 520 acquires, by using the ultrasonic listening port, ultrasonic waves transmitted by the server 510.

At S507, the user terminal 520 parses and restores the product information from the acquired ultrasonic waves. The user terminal 520 decodes the ultrasonic waves to obtain the product information in a human-perceivable form. In some embodiments, upon receiving the ultrasonic waves and/or restoring the product information, the user terminal 520 requests a user permission from the user to output the product information. The user can provide the user permission for an immediate output of the product information. Alternatively, the user can instruct the user terminal 520 to store the product information in a memory of the user terminal 520 for accesses in the future.

Figure 6:
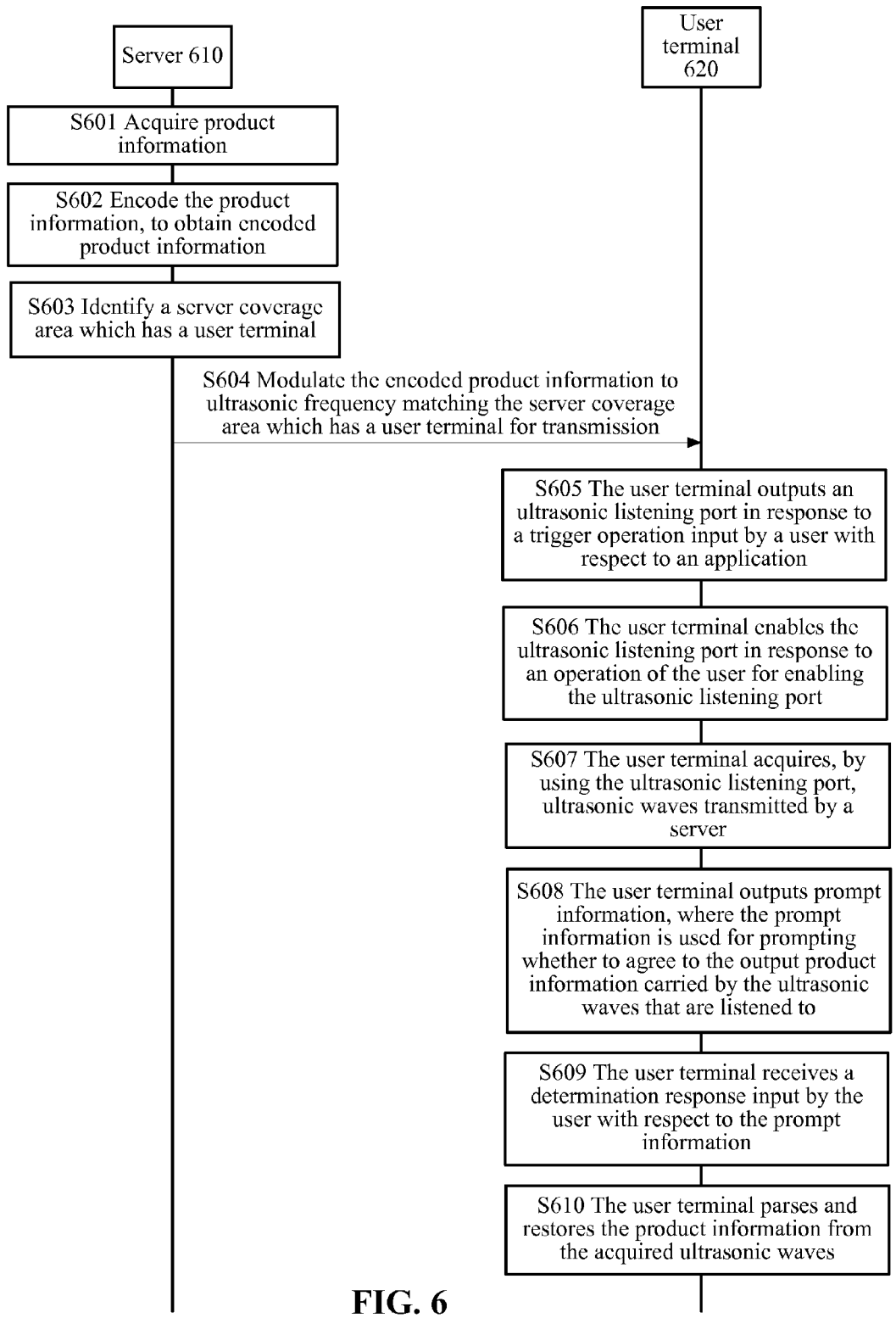
FIG. 6 is a flowchart illustrating an information transmission method performed at a server and a user terminal in accordance with some embodiments.

FIG. 6 is a flowchart illustrating an information transmission method 600 performed at a server 610 and a user terminal 620 in accordance with some embodiments. Similar to the methods 100, 500 shown and described with respect to FIGS. 1 and 5 respectively, at least a first portion of the method 600 is performed at the server 610, and at least a second portion of the method 600 is performed at the user terminal 620. The server 610 can be structurally and functionally similar to the servers 110, 510 in FIGS. 1 and 5, and the user terminal 620 can be structurally and functionally similar to the user terminals 120, 520 in FIGS. 1 and 5.

In some embodiments, each of the server 610 and the user terminal 620 that collectively perform the method 600 can include one or more processors and memory. In some embodiments, the first portion of the method 600, which is performed at the server 610, is governed by instructions that are stored in a non-transitory computer readable storage medium of the server 610 and executed by one or more processors of the server 610. Similarly, the second portion of the method 600, which is performed at the user terminal 620, is governed by instructions that are stored in a non-transitory computer readable storage medium of the user terminal 620 and executed by one or more processors of the user terminal 620. As a result of the method 500 being performed, information can be transmitted from the server 610 to the user terminal 620. As shown in FIG. 6, the information transmission method 600 includes the following steps.

At S601, the server 610 acquires product information. At S602, the server 610 encodes the product information to obtain encoded product information. At S603, the server 610 identifies a server coverage area that includes the user terminal 620. At S604, the server 610 modulates the encoded product information to an ultrasonic frequency that determines a coverage area of ultrasonic waves, which covers the location of the user terminal 620. Thus, through steps S603 and S604, server 610 modulates the encoded product information to ultrasonic waves for transmission.

In some embodiments, the server 610 can detect a user terminal that is at a location in proximity to the server 610 (or an ultrasound transmitter of the server 610). The server 610 can calculate a distance to the detected user terminal. Based on the calculated distance, the server 610 can then determine a radius for a coverage area that covers the location of the detected user terminal. That is, the radius is greater than the calculated distance. Next, the server 610 can determine a frequency for the transmitted ultrasonic waves, such that the resulted coverage area of the ultrasonic waves matches the required coverage area. As a result, any receiving device (e.g., a user terminal equipped with an ultrasonic receiver) within the resulted coverage area of the ultrasonic waves can effectively receive the ultrasonic waves. In some embodiments, a higher ultrasonic frequency determines a longer radius, thus resulting in a larger coverage area. In some embodiments, an ultrasonic frequency determining a coverage area can be, for example, substantially proportional to the radius of that coverage area. In such a method, the server 610 can flexibly adjust the ultrasonic frequency according to the location of the detected user terminal, thus effectively reducing power consumption for the ultrasonic wave transmission.

For example, as shown in FIG. 7, a server 700 (similar to the server 610 in FIG. 6) detects a user terminal 710 (similar to the user terminal 620 in FIG. 6) at a location in proximity to the server 700, and calculates a distance to the user terminal 710. Based on the calculated distance, the server 700 determines a radius 715 for a coverage area (the inner circle in FIG. 7) that covers the location of the user terminal 710. That is, the radius 715 is greater than the distance between the server 700 and the user terminal 710. The server 700 then determines an ultrasonic frequency f1 for transmitting ultrasonic waves, such that the resulted coverage area of the ultrasonic waves matches the required coverage area (the inner circle in FIG. 7) that includes the user terminal 710. As a result, the ultrasonic waves transmitted from the server 700 at the ultrasonic frequency f1 can be effectively received by the user terminal 710.

For another example, as shown in FIG. 7, the server 700 detects a user terminal 720 at a location in proximity to the server 700 and outside the coverage area associated with the ultrasonic frequency f1. The server 700 calculates a distance to the user terminal 720. Based on the calculated distance, the server 700 determines a radius 725 for a coverage area (the outer circle in FIG. 7) that covers the location of the user terminal 720. That is, the radius 725 is greater than the distance between the server 700 and the user terminal 720. The server 700 then determines an ultrasonic frequency f2 for transmitting ultrasonic waves, such that the resulted coverage area of the ultrasonic waves matches the required coverage area (the outer circle in FIG. 7) that includes the user terminal 720. As a result, the ultrasonic waves transmitted from the server 700 at the ultrasonic frequency f2 can be effectively received by the user terminal 720. Additionally, as a result of the radius 725 being longer than the radius 715, the ultrasonic frequency f2 determined based on the radius 725 is greater than the ultrasonic frequency f1 determined based on the radius 715.

At S605, the user terminal 620 outputs an ultrasonic listening port in response to a trigger operation input by a user with respect to an application. At S606, the user terminal 620 enables the ultrasonic listening port in response to an operation of the user for enabling the ultrasonic listening port. In some embodiments, upon detecting the ultrasonic waves encoded with the product information, the user terminal 620 can request a user permission from the user to capture the ultrasound-encoded product information. The user can provide the user permission by, for example, performing the trigger operation to output the ultrasonic listening port in S605 and/or performing the operation to enable the ultrasonic listening port in S606. As a result of obtaining the user permission, at S606, the user terminal 620 acquires, by using the ultrasonic listening port, ultrasonic waves transmitted by the server 610.

In some embodiments, upon acquiring the ultrasonic waves, at S608, the user terminal 620 outputs prompt information to request a user permission for outputting the product information carried by the acquired ultrasonic waves. At S609, the user terminal 620 receives a response input by the user with respect to the prompt information. If the response input includes an instruction from the user to output the product information, at S610, the user terminal 620 parses and restores the product information from the acquired ultrasonic waves. Furthermore, the user terminal 620 outputs the product information in a human-perceivable form. Alternatively, if the response input includes an instruction from the user to store the product information, user terminal 620 can store the product information in a memory of the user terminal 620 for future accesses. As another alternative, if the response input includes an instruction from the user to discard the product information or if the user terminal 620 fails to receive the requested user permission for outputting the product information, the user terminal 620 refrains from outputting and/or storing the product information.

Figure 8:
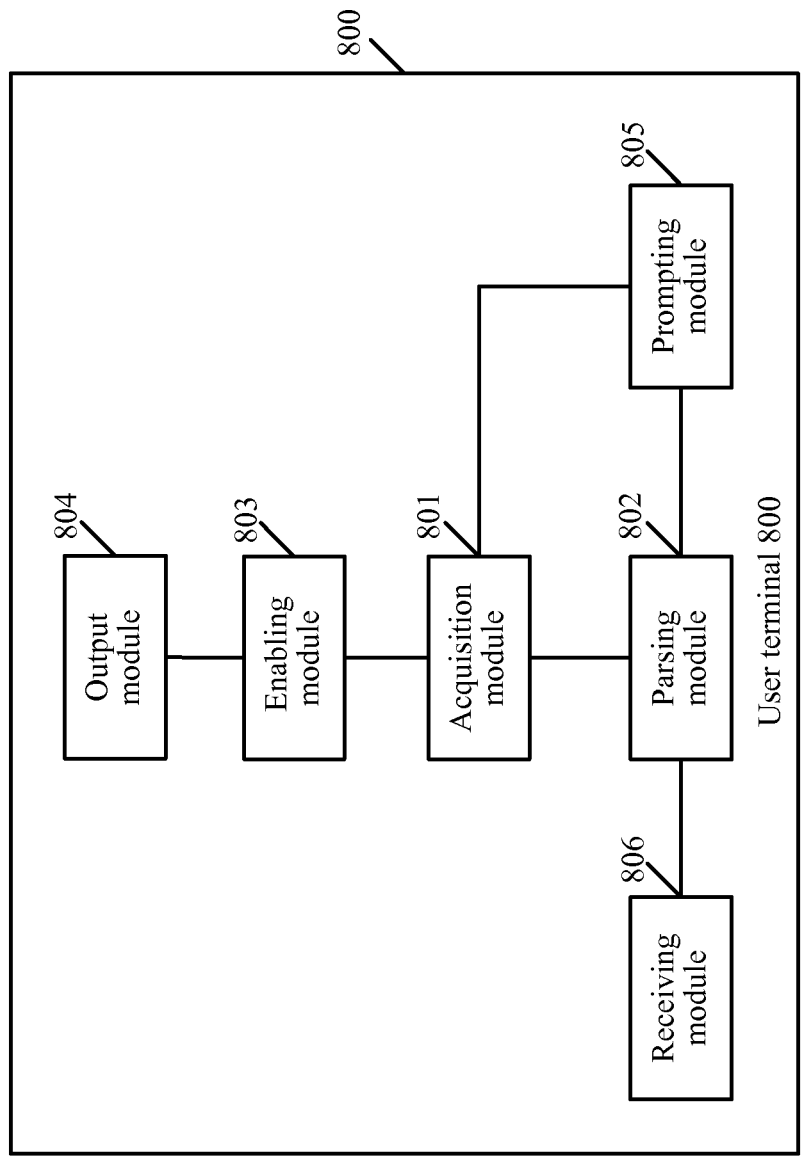
FIG. 8 is a block diagram illustrating structure of a user terminal in accordance with some embodiments.

FIG. 8 is a block diagram illustrating structure of a user terminal 800 in accordance with some embodiments. The user terminal 800 can be structurally and functionally similar to the user terminals shown and described above with respect to FIGS. 1-7. As shown in FIG. 8, the user terminal 800 includes an acquisition module 801, a parsing module 802, an enabling module 803, an output module 804, a prompting module 805, and a receiving module 806. In some embodiments, each module included in the user terminal 800 can be a hardware-based module (e.g., a digital signal processor (DSP), a field programmable gate array (FPGA), etc.), a software-based module (e.g., a module of computer code executed at a processor, a set of processor-readable instructions executed at a processor, etc.), or a combination of hardware and software modules. Instructions or code of each module can be stored in a memory of the user terminal 800 (not shown in FIG. 8) and executed at a processor of the user terminal 800 (not shown in FIG. 8). In some embodiments, the user terminal 800 can include more or less modules, units and/or components than those shown in FIG. 8.

Specifically, the acquisition module 801 is configured to acquire ultrasonic waves transmitted by a server (e.g., the servers shown and described with respect to FIGS. 1-7). In some embodiments, although not shown in FIG. 8, the acquisition module 801 is associated with an ultrasonic receiver and/or an ultrasonic listening port. In such embodiments, the acquisition module 801 is configured to acquire the ultrasonic waves by using the ultrasonic receiver and/or the ultrasonic listening port.

The parsing unit 802 is configured to, among other functions, parse and restore product information from acquired ultrasonic waves. In some embodiments, the parsing unit 802 is configured to demodulate and/or decode the acquired ultrasonic waves to obtain the product information. In some embodiments, the parsing unit 802 is configured to restore the product information to a human-perceivable form (e.g., a text message, an image, an audio clip, a video clip, etc.), such that the restored product information can be output by the user terminal 800 to a user of the user terminal 800.

The enabling module 803 is configured to, among other functions, enable the ultrasonic listening port of the user terminal 800. Typically, the enabling module 803 enables the ultrasonic listening port of the user terminal 800 before the acquisition module 801 acquires ultrasonic waves using the ultrasonic listening port. In some embodiments, as described above with respect to FIGS. 3-4, the enabling module 803 is configured to enable the ultrasonic listening port in response to, for example, an operation of the user of the user terminal 800.

The output module 804 is configured to, among other functions, output the ultrasonic listening port of the user terminal 800. Typically, the output module 804 outputs the ultrasonic listening port of the user terminal 800 before the enabling module 803 enables the ultrasonic listening port. In some embodiments, as described able with respect to FIGS. 3-4, the output module 804 is configured to output the ultrasonic listening port in response to, for example, a trigger operation input by the user with respect to an application executed at the user terminal 800.

The prompting module 805 is configured to, among other functions, output prompt information to request a user permission for outputting the product information carried by the ultrasonic waves. Typically, the prompting module 805 outputs the prompt information after the acquisition module 801 acquires the ultrasonic waves transmitted by the server, and before the parsing module 802 parses and restores the product information from the acquired ultrasonic waves. In some embodiments, the user terminal 800 by default outputs the product information. In other words, the user terminal 800 outputs the product information unless an explicit rejection is received from the user. In some other embodiments, the user terminal 800 by default does not output the product information. In other words, the user terminal 800 refrains from outputting the product information unless an explicit affirmative instruction is received from the user.

The receiving module 806 is configured to, among other functions, receive user instructions in response to the prompt information sent by the prompting module 805. Upon receiving an affirmative instruction for outputting the product information, the receiving module 806 triggers the parsing module 802 to parse and restore the product information from the acquired ultrasonic waves.

While shown and described with respect to FIG. 8 as each module of the user terminal 800 performing a separate function, in other embodiments, one or more of the modules can be combined into a single module, and functions performed by different modules can be combined accordingly. For example, the output module 804 and the enabling module 803 can be combined into a single module configured to activate the ultrasonic listening port of the user terminal 800. Similarly, in some embodiments, a module can consist of multiple sub-modules, each of which performs a portion of the function associated with that module. For example, the parsing module 802 can consist of two sub-modules, which separately perform a parsing function (i.e., parsing acquired ultra waves into multiple sections) and a restoring function (i.e., restoring each section to a message of product information).

Figure 9:
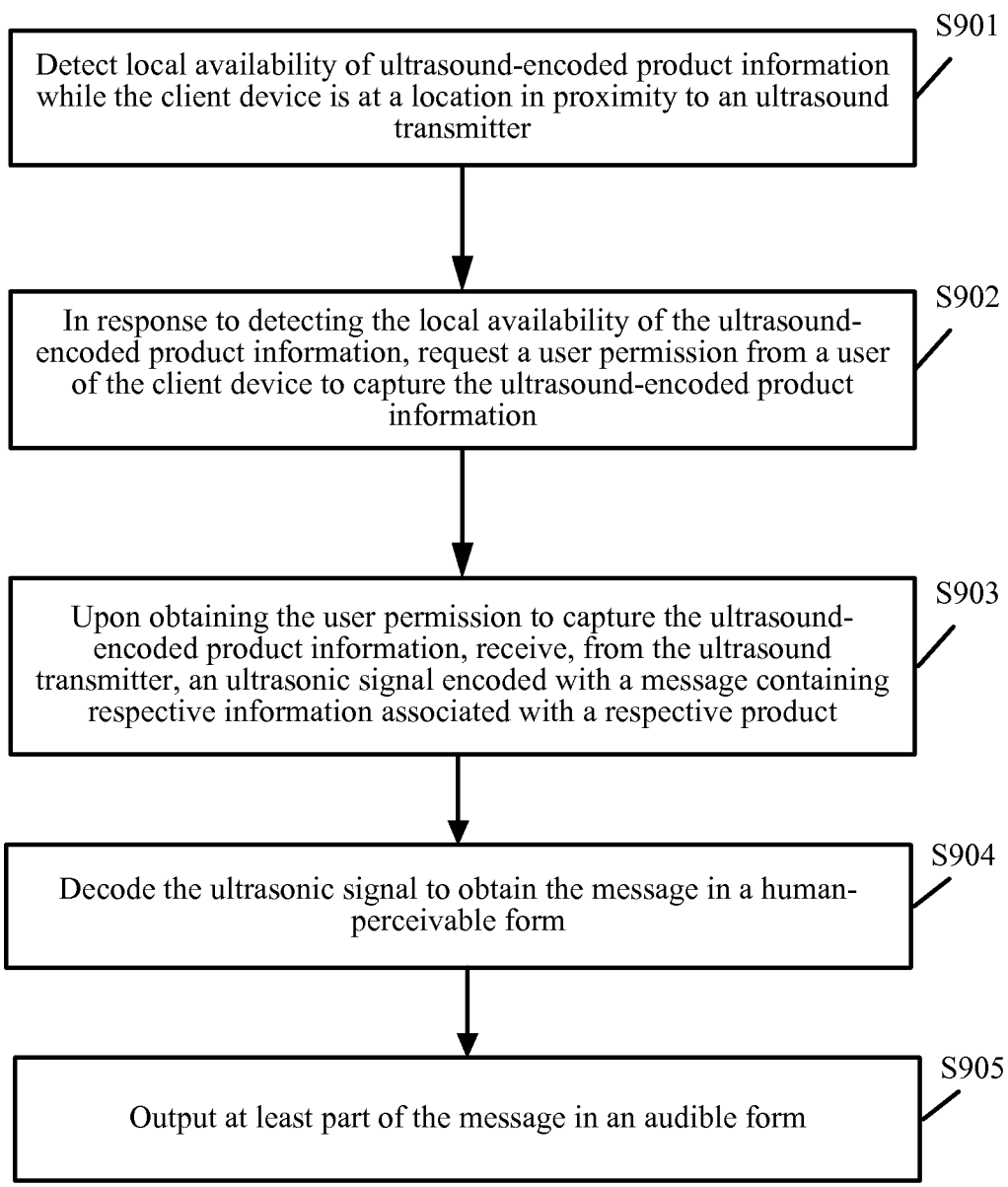
FIG. 9 is a flowchart illustrating of an information transmission method performed at a user terminal in accordance with some embodiments.

In some embodiments, the user terminal 800 (e.g., a client device) is configured to perform a method for information transmission shown in FIG. 9. The client device has one or more processors and memory for storing programs to be executed by the one or more processors. As shown in FIG. 9, the method includes detecting (S901) local availability of ultrasound-encoded product information while the client device is at a location in proximity to an ultrasound transmitter. The method includes requesting (S902), in response to the detection of local availability of the ultrasound-encoded product information, a user permission from a user of the client device to capture the ultrasound-encoded product information. In some instances, a user permission is obtained by detecting no explicit user rejection to the requesting during a predetermined time window after the requesting. The method also includes receiving (S903), upon obtaining the user permission, an ultrasonic signal from the ultrasound transmitter, where the ultrasonic signal is encoded with a message containing respective information associated with a respective product. The method further includes decoding the ultrasonic signal to obtain the message in a human-perceivable form.

In some embodiments, the method includes outputting (S904) at least part of the message in an audible form. In some instances, the method includes storing the obtained message in a memory of the client device such that the obtained message can be output from the client device at a later time.

In some embodiments, the method includes storing a current user permission state for capturing available ultrasound-encoded product information. The method includes requesting an updated user permission upon detection of a new source of available ultrasound-encoded product information that is different from a last detected source of available ultrasound-encoded product information. The updated user permission is requested to capture the ultrasound-encoded product information from the new source. The method further includes, as a result of failing to obtain the updated user permission, changing the current user permission state and preventing subsequent receipt of the ultrasound-encoded product information from the new source.

In some embodiments, the method includes detecting concurrent local availability of ultrasound-encoded product information from multiple ultrasound transmitters located in proximity to the client device. The method also includes, in response to the detection of the multiple ultrasound transmitters, displaying a request for the user to select from the multiple ultrasound transmitters for subsequent message retrieval. The method further includes, in accordance with a user selection provided in response to the request, determining whether to receive or prevent subsequent receipt of ultrasound-encoded product information from each of the multiple ultrasound transmitters.

In some embodiments, the method includes sending a signal to subscribe to a service associated with receiving messages including product information via ultrasonic signals. In some instances, the method includes activating an ultrasonic listening port of the client device after obtaining the user permission and prior to receiving the ultrasonic signal. In such instances, the method also includes deactivating the ultrasonic listening port of the client device after receiving the ultrasonic signal and in response to a revocation of the user permission.

Figure 10:
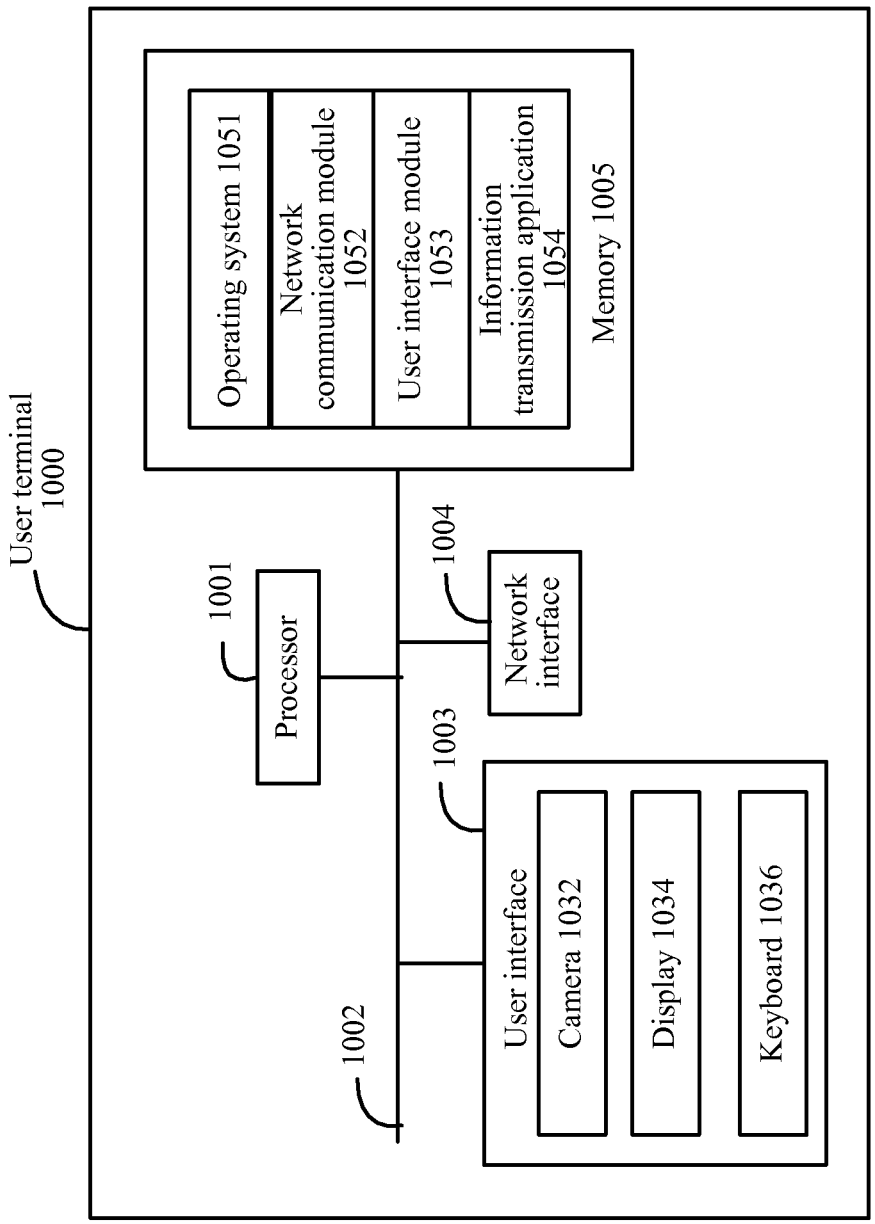
FIG. 10 is a block diagram illustrating structure of a user terminal in accordance with some embodiments.

FIG. 10 is a block diagram illustrating structure of an exemplary user terminal 1000 in accordance with some embodiments. The user terminal 1000 can be structurally and functionally configured to perform the methods described above with respect to FIGS. 1-9. As shown in FIG. 10, the user terminal 1000 includes at least a processor 1001, a network interface 1004, a communication bus 1002, a user interface 1003 and a memory 1005. The user interface includes a camera 1032, a display 1034 and a keyboard 1036. The memory 1005 includes an operating system 1051, a network communication module 1052, a user interface module 1053 and an information transmission application 1054. In some embodiments, the user terminal 1000 can include more or fewer devices, components and/or modules than those shown in FIG. 10. For example, the user interface 1003 can optionally include a mouse and a speaker in some embodiments.

The processor 1001 can be any processing device capable of performing at least a portion of the information transmission methods described herein. Such a processor can be, for example, a CPU, a DSP, a FPGA, and/or the like. The processor 1001 can be configured to control the operations of other components and/or modules of the user terminal 1000. For example, the processor 1001 can be configured to control operations of the user interface 1003 and the network interface 1004. For another example, the processor 1001 can be configured to execute instructions or code stored in a software program or module (e.g., the operating system 1051, the network communication module 1052, the user interface module 1053, and the information transmission application 1054) within the memory 1005.

The communication bus 1002 is configured to implement connections and communication among the other components of the user terminal 1000. The user interface 1003 is configured to provide and control interfaces that are used to interact with a user of the user terminal 1000. Such interfaces can include, for example, a camera, a display (e.g., a monitor, a screen), a keyboard, a mouse, a touch pen, a speaker, and/or the like. In some embodiments, operations of the user interface 1003 are controlled by instructions or code stored in the user interface module 1053 in the memory 1005.

The network interface 1004 is configured to provide and control network interfaces of the user terminal 1000 that are used to interact with other network devices. The network interface 1004 can include, for example, a standard wired interface and a standard wireless interface (e.g., a Wi-Fi interface). In some embodiments, the network interface 1004 is used for connecting a server and performing data communication with the server. In some embodiments, operations of the network interface 1004 are controlled by instructions or code stored in the network communication module 1052 in the memory 1005.

In some embodiments, the memory 1005 can include, for example, a random-access memory (RAM) (e.g., a DRAM, a SRAM, a DDR RAM, etc.), a non-volatile memory such as one or more magnetic disk storage devices, optical disk storage devices, flash memory devices, or other non-volatile solid state storage devices. In some embodiments, the memory 1005 can include one or more storage devices (e.g., a removable memory) remotely located from other components of the user terminal 1000.

In some embodiments, each component, program, application or module (e.g., the operating system 1051, the network communication module 1052, the user interface module 1053, the information transmission application 1054) included in the memory 1005 can be a hardware-based module (e.g., a DSP, a FPGA), a software-based module (e.g., a module of computer code executed at a processor, a set of processor-readable instructions executed at a processor), or a combination of hardware and software modules. Instructions or code of each component, program, application or module can be stored in the memory 1005 and executed at the processor 1001. In some embodiments, the memory 1005 can include more or fewer components, programs, applications or modules than those shown in FIG. 10.

In some embodiments, the user terminal 1000 is configured to perform at least a portion of the information transmission methods shown and described above with respect to FIGS. 1-9. In such embodiments, the user terminal 1000 communicates with a server device (similar to the servers shown and described above with respect to FIGS. 1-9) that transmits ultrasonic signals encoded with product information. The information transmission application 1054, when executed by the processor 1001, is configured to perform at least a portion of the information transmission methods to capture the ultrasonic signals, restore the product information from the captured ultrasonic signals, and/or output the restored product information.

Figure 11:
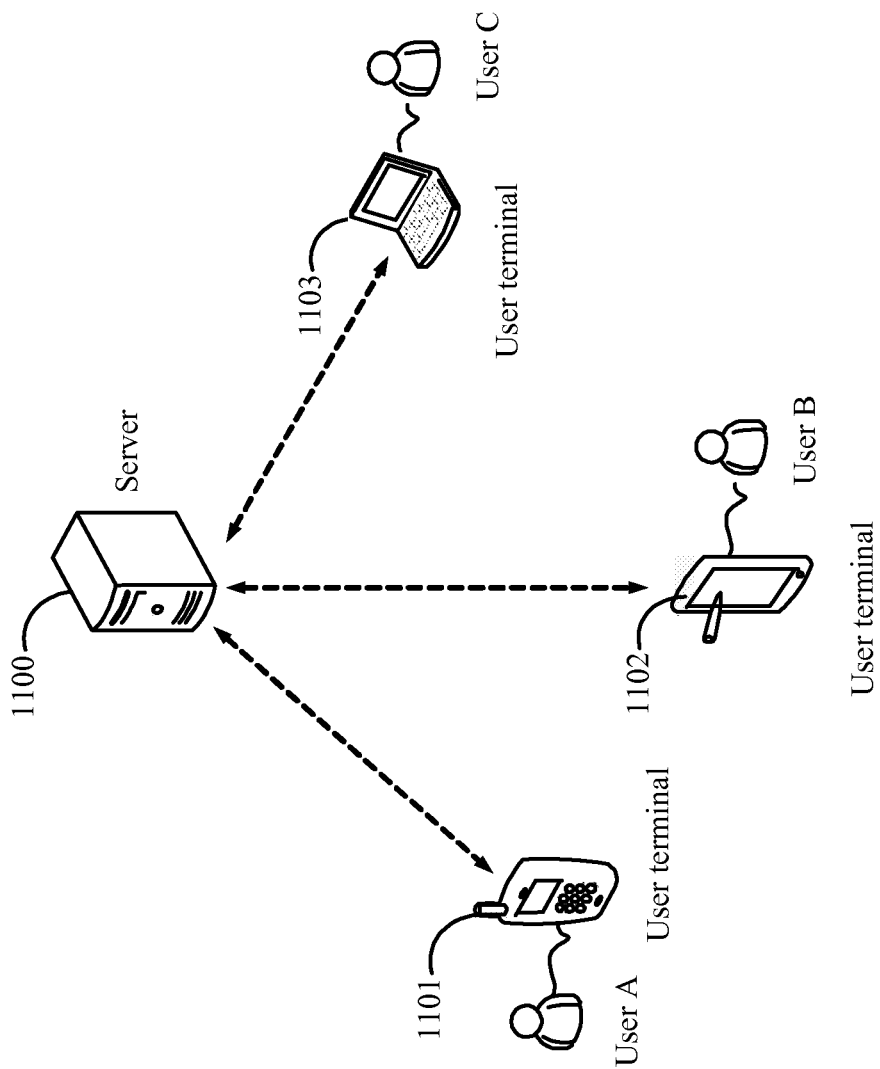
FIG. 11 is a schematic diagram illustrating an information transmission system in accordance with some embodiments.

FIG. 11 is a schematic diagram illustrating an information transmission system 1100 in accordance with some embodiments. As shown in FIG. 11, the information transmission system 1100 includes a server 1110, a user terminal 1101 operated by user A, a user terminal 1102 operated by user B, and a user terminal 1103 operated by user C. The server 1110 can be structurally and functionally similar to the servers shown and described above with respect to FIGS. 1-9. The user terminals 1101, 1102 and 1103 can be structurally and functionally similar to the user terminals shown and described above with respect to FIGS. 1-9. In some embodiments, the server 1110 (or an ultrasound transmitter thereof) can be located in, for example, a shopping mall, a shop, a museum, a plaza, a square, a market, or any other place where product information can be transmitted to potential customers.

The server 1110 is equipped with an ultrasonic transmitter and each user terminal 1101, 1102, 1103 is equipped with an ultrasonic receiver. Each of the user terminals 1101, 1102 and 1103 is at a location in proximity to the server 1110 (or an ultrasound transmitter thereof). As shown and described above with respect to FIGS. 6 and 7, the server 1110 can determine a coverage for information transmission via ultrasonic signals, where the coverage can cover the location(s) of any or all of the user terminals 1101, 1102, 1103. As a result, the user terminal(s) 1101, 1102, 1103 that is within the coverage can communicate with the server 1110 to perform the information transmission methods shown and described above with respect to FIGS. 1-9.

While shown and described herein with respect to FIGS. 1-10 as a user terminal communicating with a single source of ultrasound-encoded product information, in some embodiments, a user terminal can communicate with multiple sources of ultrasound-encoded product information. Such multiple sources of ultrasound-encoded product information can be, for example, different servers or ultrasound transmitters that are transmitting ultrasonic waves encoded with product information, or the same server or ultrasound transmitter that is transmitting ultrasonic waves encoded with different product information (e.g., information of different products, product information from different shops). In some embodiments, a server (e.g., equipped with multiple ultrasonic transmitters) is capable of concurrently transmitting ultrasonic waves encoded with different product information at different frequencies or using different modulation and/or coding schemes. In such embodiments, the server functions as multiple sources of ultrasound-encoded product information. Likewise, a user terminal (e.g., equipped with multiple ultrasonic receivers) can be configured to receive, from multiple sources, ultrasonic waves encoded with different product information.

In some embodiments, a user terminal can be configured to detect concurrent local availability of ultrasonic-encoded product information from multiple servers (or ultrasound transmitters) located in proximity to that terminal device. In response to such a detection, the user terminal can be configured to prompt instructions from a user of the user terminal associated with subsequent message retrieval. For example, the user terminal can be configured to display a request for the user to select one or more servers from the multiple servers. Such a request can be presented in the form of, for example, checkboxes on a user interface to the user. Upon receiving a user selection provided in response to the prompt, the user terminal can be configured to determine whether to receive or prevent subsequent receipt of ultrasound-encoded product information from each of the multiple servers, in accordance with the information transmission methods described herein.

In some embodiments, after a user terminal receives a user permission for capturing available ultrasound-encoded product information from a source (e.g., a server), the user terminal can be configured to store a current user permission state associated with the received user permission. Subsequently, upon detection of a new source of available ultrasound-encoded product information (e.g., a different server, the same server transmitting different product information) that is different from the existing source, the user terminal can be configured to request an updated user permission to capture the ultrasound-encoded product information from the new source. In response to obtaining the updated user permission associated with capturing the ultrasound-encoded product information from the new source, the user terminal can be configured to receive the ultrasound-encoded product information from the new source. Meanwhile, the user terminal can be configured to update the current user permission state with the updated user permission. Otherwise, in response to a failure to obtain the updated user permission associated with capturing the ultrasound-encoded product information from the new source, the user terminal can be configured to refrain from receiving the ultrasound-encoded product information from the new source. Meanwhile, the user terminal can be configured to modify the current user permission state to reflect the failure to obtain the updated user permission.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of receiving product information, comprising:
 at a client device having a display, an ultrasonic listening port, one or more processors, and memory for storing programs to be executed by the one or more processors:
  detecting local availability of ultrasound-encoded product information while the client device is at a location in proximity to an ultrasound transmitter that is communicatively connected to a remote server, the remote server being configured to:
  determine a distance between the client device and the ultrasound transmitter;
  based on the distance, determine a frequency for an ultrasonic signal to be broadcasted by the ultrasound transmitter within an ultrasonic signal coverage area including the client device, wherein the frequency is proportional to a radius of the ultrasonic signal coverage area centered at the ultrasound transmitter and the radius of the ultrasonic signal coverage area is greater than the distance;
  encode the ultrasonic signal with a message containing respective information associated with a respective product; and
  send the ultrasound-encoded product information to the ultrasound transmitter to be broadcasted in the ultrasonic signal coverage area;
in response to detecting the local availability of the ultrasound-encoded product information, requesting a user permission from a user of the client device to capture the ultrasound-encoded product information by displaying, on the display, an instruction to activate the ultrasonic listening port of the client device;
detecting shaking of the client device, by the user of the client device, in accordance with the instruction to activate the ultrasonic listening port of the client device displayed on the display; and
in response to detecting the shaking:
  activating the ultrasonic listening port;
  receiving at the activated ultrasonic listening port, from the ultrasound transmitter, an ultrasonic signal broadcasted at the frequency while the client device is positioned within the ultrasonic signal coverage area determined by the remote server; and
  decoding the ultrasonic signal to obtain the message in a human-perceivable form.

2. The method of claim 1, further comprising:
outputting at least part of the message in an audible form.

3. The method of claim 1, further comprising, at the client device:
storing a current user permission state for capturing available ultrasound-encoded product information in response to detecting the shaking of the client device;
upon detection of a new source of available ultrasound-encoded product information different from a last detected source of available ultrasound-encoded product information, requesting an updated user permission to capture the ultrasound-encoded product information from the new source; and
in accordance with a failure to obtain the updated user permission, changing the current user permission state and preventing subsequent receipt of the ultrasound-encoded product information from the new source.

4. The method of claim 1, wherein:
the ultrasound transmitter is a first ultrasound transmitter;
the method further comprises
  detecting concurrent local availability of ultrasound-encoded product information from multiple ultrasound transmitters located in proximity to the client device, including the first ultrasound transmitter; and
  in response to detecting the concurrent local availability of ultrasound-encoded product information from the multiple ultrasound transmitters, displaying, based on the detecting, identifiers for each of the multiple ultrasound transmitters located in proximity to the client device;
  receiving user selection of an identifier for the first ultrasound transmitter from the displayed identifiers for subsequent message retrieval; and
  receiving the ultrasonic signal broadcasted at the frequency is performed in response to receiving the user selection of the identifier for the first ultrasound transmitter.

5. The method of claim 1, further comprising:
storing the obtained message in the memory of the client device for output at a later time.

6. The method of claim 1, further comprising:
sending a signal to subscribe to a service associated with receiving messages including product information via ultrasonic signals.

7. The method of claim 1, wherein:
the frequency is a second frequency;
the ultrasonic signal coverage area is a second ultrasonic signal coverage area;
detecting the local availability of ultrasound-encoded product information is performed while the ultrasound transmitter is broadcasting one or more ultrasonic signals at a first frequency within a first ultrasonic signal coverage area, a radius of the first ultrasonic signal coverage area being less than: (i) the radius of the second ultrasonic signal coverage area, and (ii) the distance between the client device and the ultrasound transmitter; and
the first frequency is less than the second frequency.

8. The method of claim 1, wherein:
the instruction to activate the ultrasonic listening port is displayed in a first user interface; and
the method further comprises, at the client device, after detecting the shaking of the client device:
  displaying, on the display, a second user interface, distinct from the first user interface, including an affordance to deactivate the ultrasonic listening port of the client device;
  detecting, on the display, user selection of the affordance displayed in the second user interface while receiving the ultrasonic signal; and
  in response to detecting the user selection of the affordance, deactivating the ultrasonic listening port of the client device.

9. The method of claim 1, wherein the instruction to activate the ultrasonic listening port instructs the user of the client device to shake the client device.

10. An electronic device, comprising:
a display;
an ultrasonic listening port;
one or more processors; and
memory storing one or more programs to be executed by the one or more processors, the one or more programs comprising instructions for:
detecting local availability of ultrasound-encoded product information while the electronic device is at a location in proximity to an ultrasound transmitter that is communicatively connected to a remote server, the remote server being configured to:
  determine a distance between the electronic device and the ultrasound transmitter;
  based on the distance, determine a frequency for an ultrasonic signal to be broadcasted by the ultrasound transmitter within an ultrasonic signal coverage area including the client device, wherein the frequency is proportional to a radius of the ultrasonic signal coverage area centered at the ultrasound transmitter and the radius of the ultrasonic signal coverage area is greater than the distance;

encode the ultrasonic signal with a message containing respective information associated with a respective product; and send the ultrasound-encoded product information to the ultrasound transmitter to be broadcasted in the ultrasonic signal coverage area;

in response to detecting the local availability of the ultrasound-encoded product information, requesting a user permission from a user of the electronic device to capture the activate the ultrasonic listening port of the electronic device;

detecting shaking of the electronic device, by the user of the electronic device, in accordance with the instruction to activate the ultrasonic listening port of the electronic device displayed on the display; and in response to detecting the shaking:

activating the ultrasonic listening port;

receiving at the activated ultrasonic listening port, from the ultrasound transmitter, an ultrasonic signal broadcasted at the frequency while the electronic device is positioned within the ultrasonic signal coverage area determined by the remote server; and decoding the ultrasonic signal to obtain the message in a human-perceivable form.

11. The electronic device of claim 10, wherein:

the ultrasound transmitter is a first ultrasound transmitter;

the one or more programs further comprise instructions for:

detecting concurrent local availability of ultrasound-encoded product information from multiple ultrasound transmitters located in proximity to the electronic device, including the first ultrasound transmitter; and in response to detecting the concurrent local availability of ultrasound-encoded product information from the multiple ultrasound transmitters, displaying, based on the detecting, identifiers for each of the multiple ultrasound transmitters located in proximity to the electronic device;

receiving user selection of an identifier for the first ultrasound transmitter from the displayed identifiers for subsequent message retrieval; and receiving the ultrasonic signal broadcasted at the frequency is further performed in response to receiving the user selection of the identifier for the first ultrasound transmitter.

12. The electronic device of claim 10, wherein the one or more programs further comprise instructions for:

outputting at least part of the message in an audible form.

13. The electronic device of claim 10, wherein the one or more programs further comprise instructions for:

storing a current user permission state for capturing available ultrasound-encoded product information in response to detecting the shaking of the client device;

upon detection of a new source of available ultrasound-encoded product information different from a last detected source of available ultrasound-encoded product information, requesting an updated user permission to capture the ultrasound-encoded product information from the new source; and in accordance with a failure to obtain the updated user permission, changing the current user permission state and preventing subsequent receipt of the ultrasound-encoded product information from the new source.

14. The electronic device of claim 10, wherein the one or more programs further comprise instructions for:

in response to a failure to detect the shaking, preventing receipt of the ultrasound-encoded product information from the ultrasound transmitter.

15. A non-transitory computer readable storage medium of a client device having a display, an ultrasonic listening port, and memory storing one or more programs, the one or more programs comprising instructions, which, when executed by one or more processors of the client device, cause the processors to perform operations comprising:

detecting local availability of ultrasound-encoded product information while the client device is at a location in proximity to an ultrasound transmitter that is communicatively connected to a remote server, the remote server being configured to:

determine a distance between the client device and the ultrasound transmitter;

based on the distance, determine a frequency for an ultrasonic signal to be broadcasted by the ultrasound transmitter within an ultrasonic signal coverage area including the client device, wherein the frequency is proportional to a radius of the ultrasonic signal coverage area centered at the ultrasound transmitter and the radius of the ultrasonic signal coverage area is greater than the distance;

encode the ultrasonic signal with a message containing respective information associated with a respective product; and send the ultrasound-encoded product information to the ultrasound transmitter to be broadcasted in the ultrasonic signal coverage area;

in response to detecting the local availability of the ultrasound-encoded product information, requesting a user permission from a user of the client device to capture the ultrasound-encoded product information by displaying, on the display, an instruction to activate the ultrasonic listening port of the client device;

detecting shaking of the client device, by the user of the client device, in accordance with the instruction to activate the ultrasonic listening port of the client device displayed on the display; and in response to detecting the shaking:

activating the ultrasonic listening port;

receiving at the activated ultrasonic listening port, from the ultrasound transmitter, an ultrasonic signal broadcasted at the frequency while the client device is positioned within the ultrasonic signal coverage area determined by the remote server; and decoding the ultrasonic signal to obtain the message in a human-perceivable form.

16. The non-transitory computer readable storage medium of claim 15, wherein the operations further comprise:

outputting at least part of the message in an audible form.

17. The non-transitory computer readable storage medium of claim 15, wherein the operations further comprise:

sending a signal to subscribe to a service associated with receiving messages including product information via ultrasonic signals.

* * * * *